US010530960B2

(12) United States Patent
Sako

(10) Patent No.: US 10,530,960 B2
(45) Date of Patent: Jan. 7, 2020

(54) TRANSMITTING WIRELESS COMMUNICATION ADVERTISEMENT PACKETS

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/819,527

(22) Filed: Nov. 21, 2017

(65) Prior Publication Data
US 2018/0152593 A1 May 31, 2018

(30) Foreign Application Priority Data

Nov. 29, 2016 (JP) ................................. 2016-230829

(51) Int. Cl.
H04N 1/333 (2006.01)
H04N 1/00 (2006.01)
H04W 4/00 (2018.01)
H04W 4/80 (2018.01)
H04W 52/02 (2009.01)

(52) U.S. Cl.
CPC ..... H04N 1/33346 (2013.01); H04N 1/00307 (2013.01); H04N 1/00896 (2013.01); H04W 4/80 (2018.02); H04N 2201/0081 (2013.01); H04N 2201/0082 (2013.01); H04W 52/0254 (2013.01)

(58) Field of Classification Search
None
See application file for complete search history.

(56) References Cited

U.S. PATENT DOCUMENTS

| 9,398,437 | B2* | 7/2016 | Kasslin | ................. H04L 45/745 |
| 2013/0178160 | A1* | 7/2013 | Wang | ................... H04W 48/10 455/41.2 |
| 2014/0254466 | A1* | 9/2014 | Wurster | ................ H04L 12/189 370/312 |
| 2016/0241726 | A1* | 8/2016 | Okamura | ........... H04N 1/00307 |

FOREIGN PATENT DOCUMENTS

| JP | 2016-152538 A | 8/2016 |
| JP | 2016-170608 A1 | 9/2016 |

OTHER PUBLICATIONS

Bluetooth Specification Version 4.0 [vol. 3],11 Advertising and Scan Response Data Format, Jun. 30, 2010, pp. 375-378.

* cited by examiner

*Primary Examiner* — Thomas D Lee
(74) *Attorney, Agent, or Firm* — Canon U.S.A., Inc. IP Division

(57) ABSTRACT

A printing apparatus performs wireless communication based on Bluetooth Low Energy by selecting a format of a Bluetooth Low Energy packet to be transmitted from a plurality of formats and transmits a Bluetooth Low Energy packet in the selected format, where the plurality of formats includes a format associated with a print application of device external to the printing apparatus.

18 Claims, 10 Drawing Sheets

FIG. 2A

| Header | Connection Information | Server or Resource Path | Port | IP Address | TX Power |

FIG. 2B

| Header | TX Power | MAC Address | Device Name | Device Category |

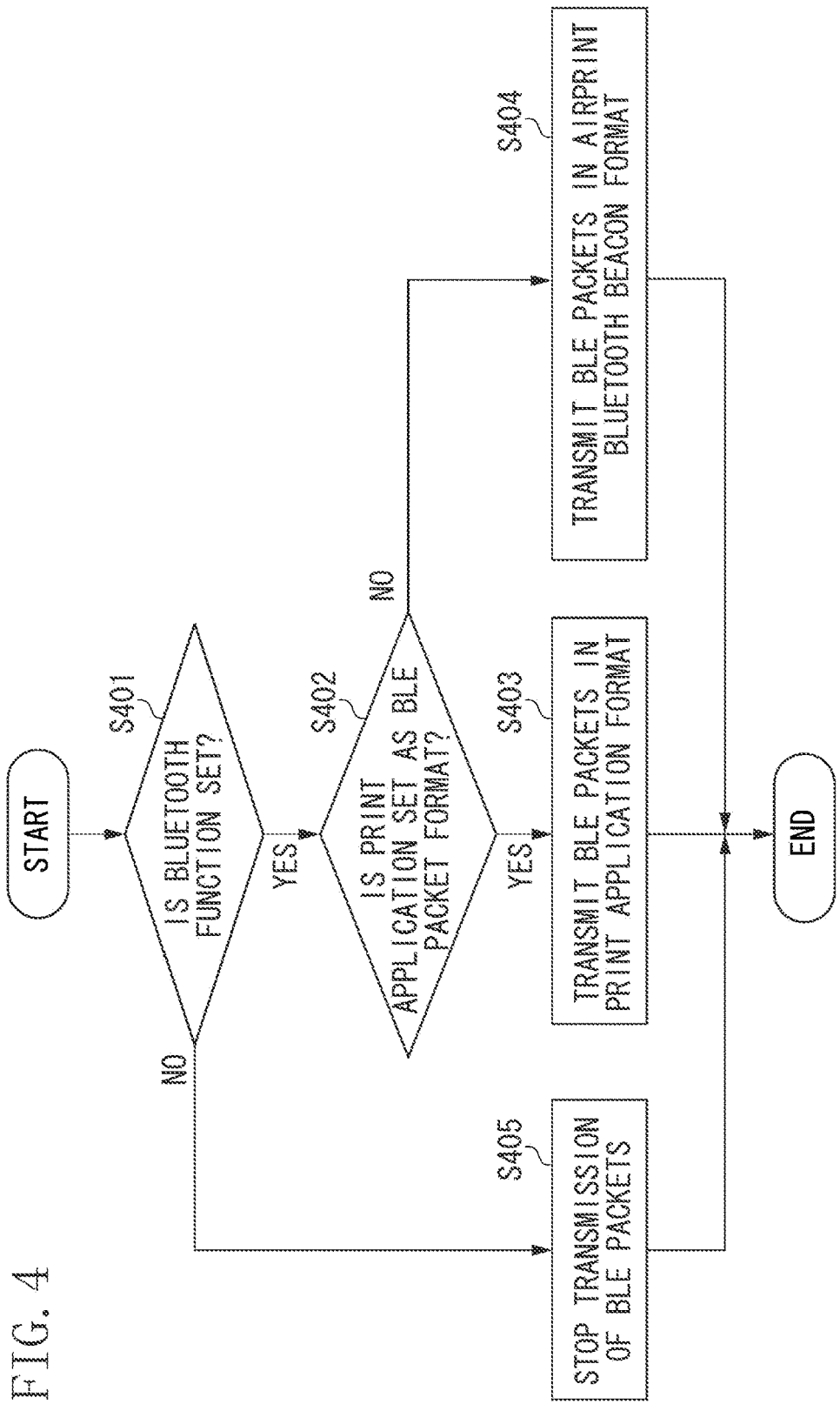

500 SETTING SCREEN

510 SETTING SCREEN

FIG. 6A

| NORMAL POWER CONSUMPTION STATE | POWER IS SUPPLIED TO ENTIRE PRINTING APPARATUS |
|---|---|
| FIRST POWER-SAVING STATE | POWER IS NOT SUPPLIED TO PRINTER AND SCANNER WHILE POWER IS SUPPLIED TO OTHER UNITS |
| SECOND POWER-SAVING STATE | POWER IS SUPPLIED TO NETWORK I/F WHILE POWER IS NOT SUPPLIED TO OTHER UNITS |
| THIRD POWER-SAVING STATE | POWER IS SUPPLIED TO NETWORK I/F AND BLUETOOTH CHIP WHILE POWER IS NOT SUPPLIED TO OTHER UNITS |

FIG. 6B

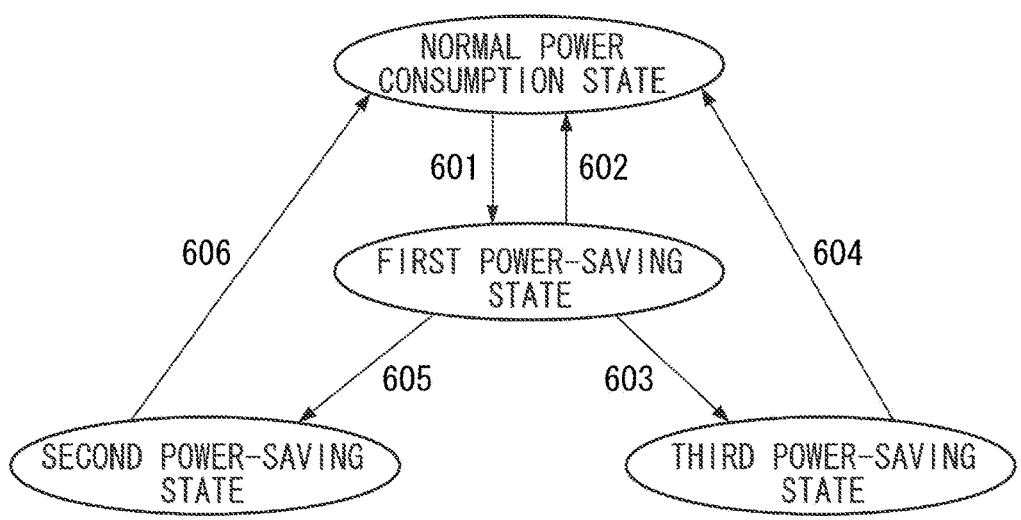

FIG. 9

| User Name | User ID | Password | BLE Packet Format |
|---|---|---|---|
| Tanaka | Tanaka1231 | 7bt89a | Print Application |
| Sato | Sato1010 | yrj47m | AirPrint Bluetooth Beacon |
| Yamada | Yamada0707 | zrh2wh | AirPrint Bluetooth Beacon |

900 User Management Table

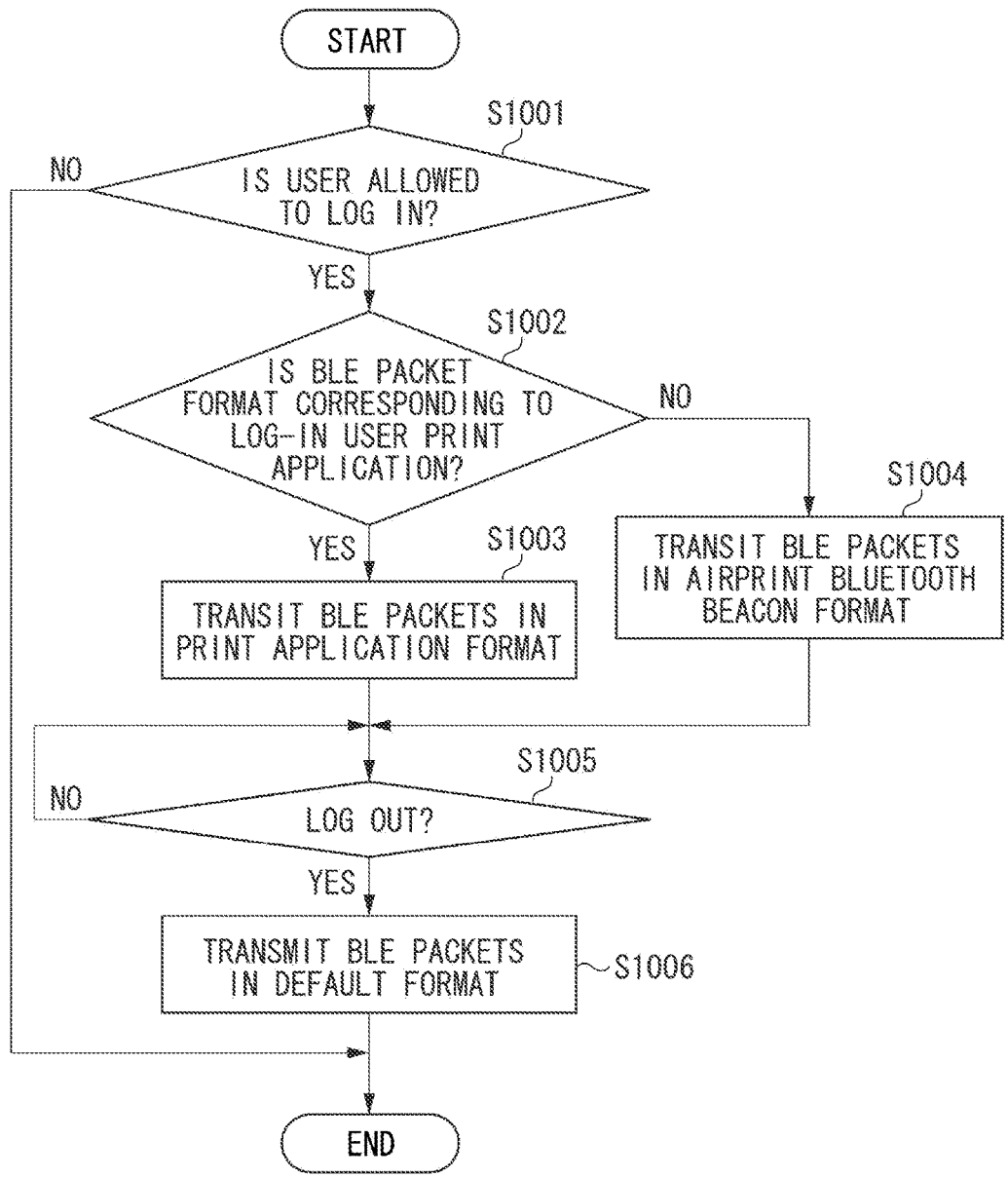

TRANSMITTING WIRELESS COMMUNICATION ADVERTISEMENT PACKETS

BACKGROUND

Field

The present disclosure relates to a printing apparatus that transmits advertisement packets.

Description of the Related Art

Bluetooth® Low Energy (BLE) advertisement packets are defined in various formats depending on companies. For example, Apple Inc. defines AirPrint® Bluetooth Beacon and Google Inc. defines EddyStone®.

Japanese Patent Application Laid-Open No. 2016-152538 discusses a configuration in which a mobile terminal searches for one or more printing apparatuses using Bluetooth Low Energy and transmits print data to a printing apparatus selected by the user from the search results.

For a Bluetooth Low Energy packet (advertisement packet), a plurality of formats is available, for example, AirPrint Bluetooth Beacon and EddyStone. Thus, a printing apparatus needs to select an appropriate format from a plurality of formats and transmit Bluetooth Low Energy packets. However, conventional printing apparatuses only assume transmitting Bluetooth Low Energy packets of one kind of format.

SUMMARY

To solve the above a printing apparatus that performs wireless communication based on Bluetooth Low Energy includes a print unit that performs print processing based on print data, a memory device that stores a set of instructions, and at least one processor that executes the instructions to select a format of a Bluetooth Low Energy packet to be transmitted from among a plurality of formats, and transmit a Bluetooth Low Energy packet in the selected format, wherein the plurality of formats includes a format corresponding to a print application that is installed in an external apparatus.

Further features will become apparent from the following description of exemplary embodiments with reference to the attached drawings.

BRIEF DESCRIPTION OF THE DRAWINGS

FIGS. 2A and 2B are diagrams each illustrating a Bluetooth Low Energy packet format.

FIG. 4 is a flowchart illustrating processing, by the printing apparatus, for selecting a format of Bluetooth Low Energy packets to be transmitted.

FIGS. 6A and 6B are diagrams each illustrating transition of a power state.

FIG. 9 is a diagram illustrating a user management table.

FIG. 10 is a flowchart illustrating processing for selecting a format of Bluetooth Low Energy packets to be transmitted on the basis of a log-in user.

DESCRIPTION OF THE EMBODIMENTS

Exemplary embodiments will be described with reference to drawings. The present disclosure is not limited to the following exemplary embodiments. In addition, not all the combinations of features described in the exemplary embodiments are necessarily essential to solving the issue.

Figure 1:
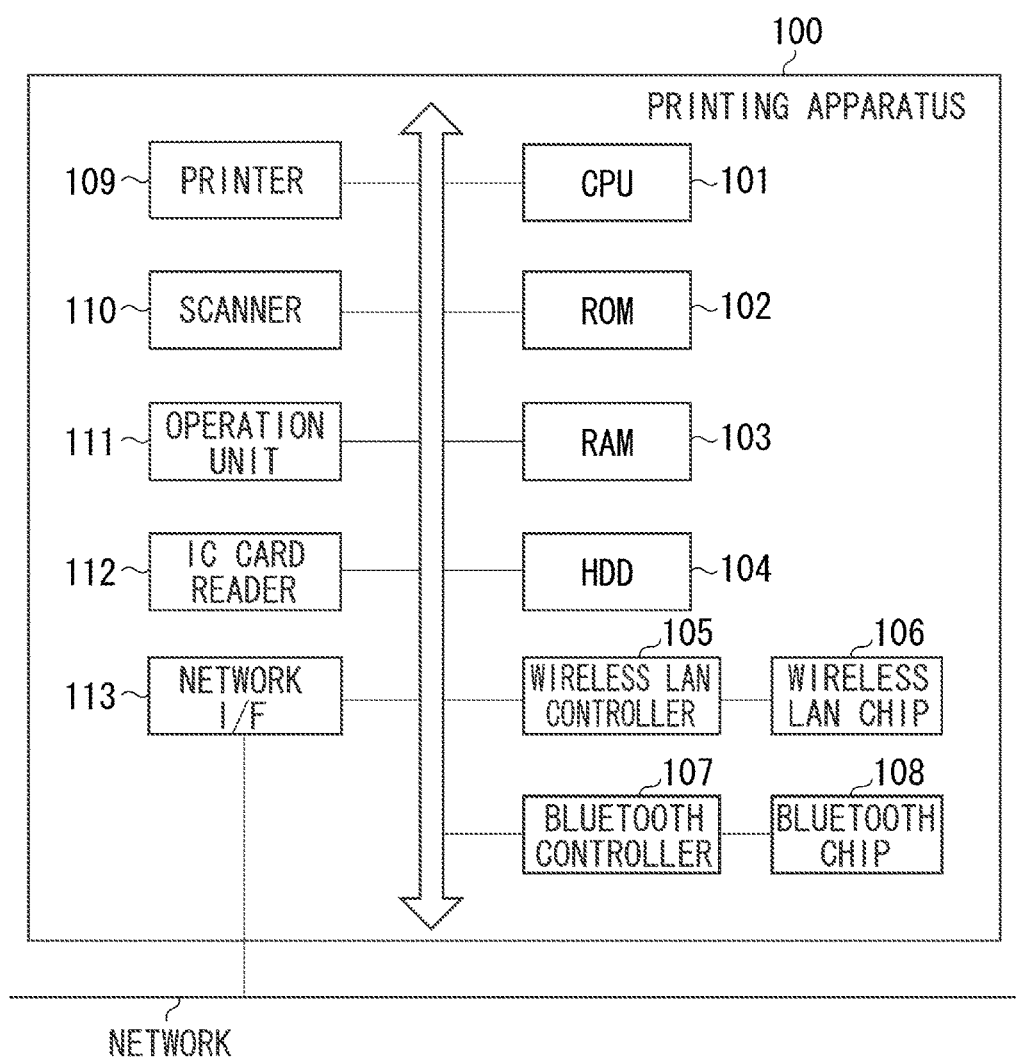
FIG. 1 is a diagram illustrating a hardware configuration of a printing apparatus.

First, a hardware configuration of a printing apparatus 100 according to a first exemplary embodiment will be described with reference to FIG. 1. A central processing unit (CPU) 101 reads a control program stored in a read-only memory (ROM) 102 and performs various processing for controlling an operation of the printing apparatus 100. The ROM 102 stores the control program. A random access memory (RAM) 103 is used as, for example, a main memory of the CPU 101 and a temporary storage area serving as a work area. A hard disk drive (HDD) 104 is a non-volatile storage medium that holds various data. While the printing apparatus 100 according to the present exemplary embodiment will be described by assuming that the single CPU 101 performs various processing illustrated in the flowcharts described below, other modes are also applicable. For example, a plurality of CPUs can coordinate with each other to perform various processing illustrated in the flowcharts described below. Alternatively, part of the processing illustrated in the flowcharts described below can be performed using a hardware circuit, such as an application-specific integrated circuit (ASIC).

A printer 109 performs print processing on a sheet based on print data that has been received by a wireless local area network (LAN) chip 106 or a network interface (I/F) 113 from an external apparatus. A scanner 110 reads a document placed thereon and generates an image of the document. The image of the document generated by the scanner 110 is printed by the printer 109 (copy process) or stored in the HDD 104.

An operation unit 111 includes a display including a touch panel function, a keyboard, etc. and displays various kinds of operational screens. The user can input instructions and information to the printing apparatus 100 via the operation unit 111. An integrated-circuit (IC) card reader 112 reads user information from an IC card. The printing apparatus 100 executes authentication processing using the user information read by the IC card reader 112.

The wireless LAN chip 106 is a chip for performing wireless LAN communication, such as IEEE802.11a/b/g/n/ac. A wireless LAN controller 105 controls the wireless LAN communication performed using the wireless LAN chip 106.

A Bluetooth chip 108 is a wireless communication chip for performing wireless communication based on Bluetooth. In addition, the Bluetooth chip 108 includes a Bluetooth Low Energy function and performs Bluetooth Low Energy communication. In Bluetooth Low Energy communication, Bluetooth Low Energy advertisement packets are broadcast at a predetermined cycle. A Bluetooth controller 107 controls the Bluetooth communication performed using the Bluetooth chip 108.

The network I/F 113 is connected to a network via a LAN cable and communicates with an external apparatus, such as a personal computer (PC), on the network. The network I/F 113 receives print data from the external apparatus and transmits an image of a document generated by the scanner 110 to the external apparatus.

The printing apparatus 100 according to the present exemplary embodiment supports a plurality of formats of advertisement packets. The Bluetooth chip 108 of the printing apparatus 100 selects a format from among the plurality of formats based on the setting result selected on a setting screen 300, which will be described with reference to FIG. 3, and transmits advertisement packets in the selected format.

The advertisement packet formats supported by the printing apparatus 100 will be described with reference to FIGS. 2A and 2B. The printing apparatus 100 according to the present exemplary embodiment supports two formats, AirPrint Bluetooth Beacon and a print application.

FIG. 2A illustrates the AirPrint Bluetooth Beacon format. AirPrint Bluetooth Beacon includes data about connection information, a path, a port number, an IP address, and a transmission power level. Advertisement packets in AirPrint Bluetooth Beacon format are used by PCs and mobile terminals supporting AirPrint. These PCs and mobile terminals search for devices using advertisement packets in AirPrint Bluetooth Beacon format. Namely, a wireless communication terminal, such as a PC or a mobile terminal, identifies a device supporting AirPrint based on AirPrint Bluetooth Beacon. The AirPrint Bluetooth Beacon format can include the IP address of the printing apparatus 100. Using the IP address included in a Bluetooth Low Energy packet based on AirPrint Bluetooth Beacon, the wireless communication terminal can establish communication based on a communication protocol different from Bluetooth Low Energy with the printing apparatus 100. For example, using the IP address included in the Bluetooth Low Energy packet, the wireless communication terminal can perform Wireless Fidelity (Wi-Fi®) communication with the printing apparatus.

FIG. 2B illustrates the print application format. The print application is a format defined by the printing apparatus 100 manufacturer and includes data about a transmission power level, a media access control (MAC) address, a device name, and a device category. The printing apparatus 100 manufacturer provides a print application for mobile terminals. A user installs the print application on the user's mobile terminal and uses print functions of the printing apparatus 100. Advertisement packets in print application format are used by mobile terminals on which the above-described print applications have been installed. Based on an advertisement packet in print application format, a wireless communication terminal, such as a PC or a mobile terminal, identifies a device supporting the print application. The print application format can include the MAC address of the printing apparatus 100. Using the MAC address included in an advertisement packet in print application format, the wireless communication terminal establishes communication based on a communication protocol different from Bluetooth Low Energy with the printing apparatus 100. For example, using the IP address and the MAC address included in the advertisement packet, the wireless communication terminal can perform Wi-Fi communication with the printing apparatus.

Figure 3:
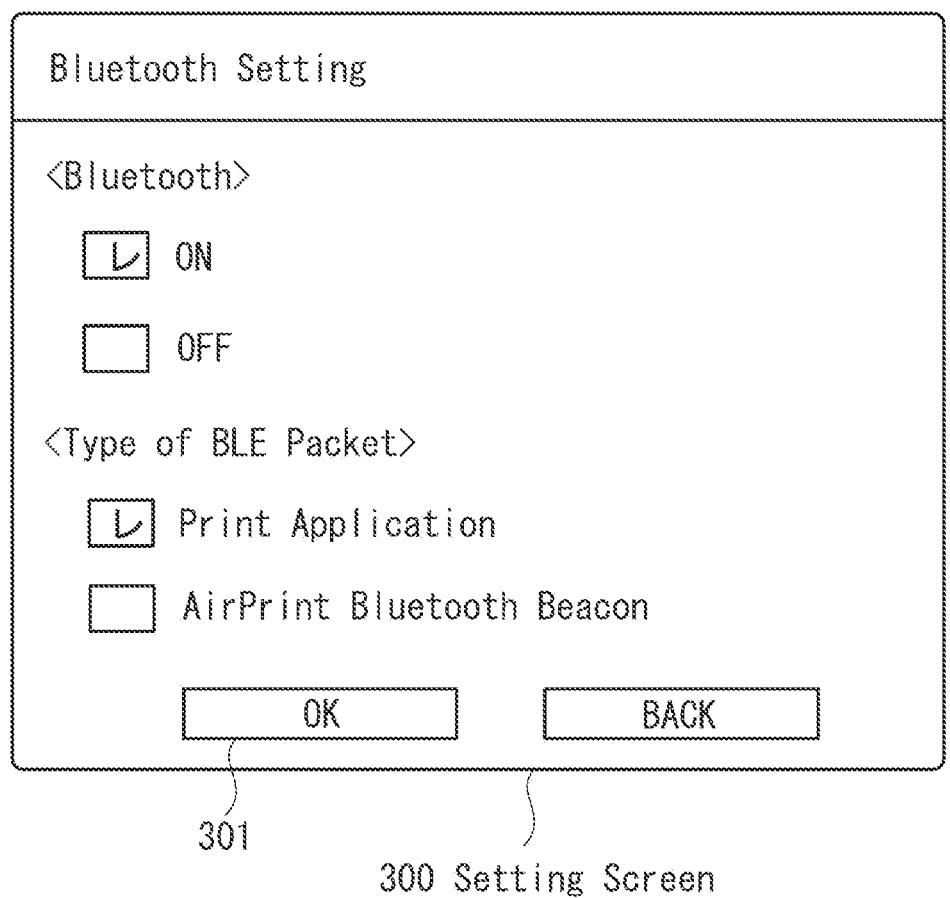
FIG. 3 is a diagram illustrating a setting screen.

Next, the setting screen 300 in FIG. 3 will be described. The operation unit 111 of the printing apparatus 100 displays the setting screen 300 and the user, e.g., a system administrator, decides whether to use the Bluetooth function on this setting screen 300. If the user wishes to use the Bluetooth function, the user selects "ON" on the setting screen 300. Otherwise, the user selects "OFF" on the setting screen 300. FIG. 3 illustrates a case in which the user has selected "ON" on the setting screen 300.

The user can also set the type of advertisement packets to be transmitted on the setting screen 300. If the user wishes to use advertisement packets in print application format described with reference to FIG. 2B, the user selects "print application" on the setting screen 300. If the user wishes to use advertisement packets in AirPrint Bluetooth Beacon format described with reference to FIG. 2A, the user selects "AirPrint Bluetooth Beacon" on the setting screen 300. FIG. 3 illustrates a case in which the user has selected "print application" on the setting screen 300. When the user presses an OK button 301, the printing apparatus 100 stores the setting result on the setting screen 300 in the HDD 104.

Next, processing of how the printing apparatus 100 selects the format of Bluetooth Low Energy advertisement packets will be described with reference to a flowchart in FIG. 4. Each step in the flowchart in FIG. 4 is performed by causing the CPU 101 to load a control program, which is stored in the ROM 102, into the RAM 103 and execute the control program. The processing in the flowchart in FIG. 4 is performed when the printing apparatus 100 is started and when the user presses the OK button 301 on the setting screen 300. Hereinafter, Bluetooth Low Energy advertisement packets will be referred to as Bluetooth Low Energy packets.

In step S401, the CPU 101 determines whether the user wishes to use the Bluetooth function by checking the setting result on the setting screen 300. As described above, the setting result is stored in the HDD 104. In a case where "OFF" is set on the setting screen 300 (NO in step S401), the CPU 101 determines that the user does not wish to use the Bluetooth function in step S401, and the processing proceeds to step S405. In a case where "ON" is set on the setting screen 300 (YES in step S401), the CPU 101 determines that the user wishes to use the Bluetooth function in step S401, and the processing proceeds to step S402.

In step S405, the CPU 101 stops transmission of Bluetooth Low Energy packets. More specifically, the CPU 101 instructs the Bluetooth controller 107 to stop transmission of Bluetooth Low Energy packets. In response, the Bluetooth controller 107 controls the Bluetooth chip 108 so that Bluetooth Low Energy packets are not transmitted. Accordingly, the Bluetooth chip 108 stops transmission of Bluetooth Low Energy packets.

In step S402, the CPU 101 determines the format of Bluetooth Low Energy packets to be transmitted, by checking the setting result on the setting screen 300. In a case where "print application" is set on the setting screen 300 (YES in step S402), the CPU 101 determines that the format of Bluetooth Low Energy packets to be transmitted is the print application, and the processing proceeds to step S403. In a case where "AirPrint Bluetooth Beacon" is set on the setting screen 300 (NO in step S402), the CPU 101 determines that the format of Bluetooth Low Energy packets to be transmitted is AirPrint Bluetooth Beacon, and the processing proceeds to step S404.

In step S403, the CPU 101 transmits Bluetooth Low Energy packets in print application format. More specifically, the CPU 101 instructs the Bluetooth controller 107 to transmit Bluetooth Low Energy packets in print application format. In response, the Bluetooth controller 107 controls the Bluetooth chip 108 so that Bluetooth Low Energy packets in print application format are transmitted. The Bluetooth chip 108 transmits Bluetooth Low Energy packets in print application format at a predetermined cycle, e.g., at 30 msec intervals.

In step S404, the CPU 101 transmits Bluetooth Low Energy packets in AirPrint Bluetooth Beacon format. More specifically, the CPU 101 instructs the Bluetooth controller 107 to transmit Bluetooth Low Energy packets in AirPrint Bluetooth Beacon format. In response, the Bluetooth controller 107 controls the Bluetooth chip 108 so that Bluetooth Low Energy packets in AirPrint Bluetooth Beacon format are transmitted. The Bluetooth chip 108 transmits Bluetooth Low Energy packets in AirPrint Bluetooth Beacon format at a predetermined cycle, e.g., at 100 msec intervals.

As described above, based on the user instruction via the setting screen 300, the printing apparatus 100 can select the format of Bluetooth Low Energy packets to be transmitted from among a plurality of formats.

Figure 5A:
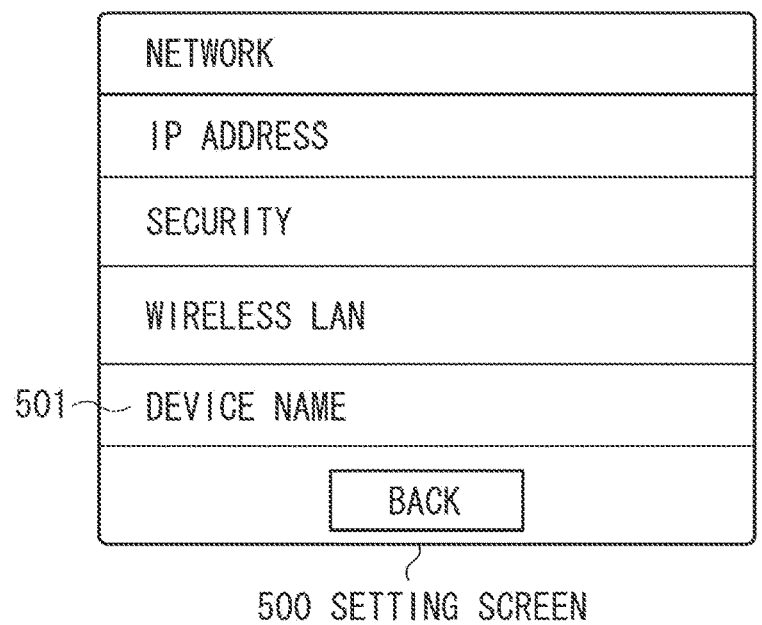
FIGS. 5A and 5B are diagrams each illustrating a setting screen.
Figure 5B:
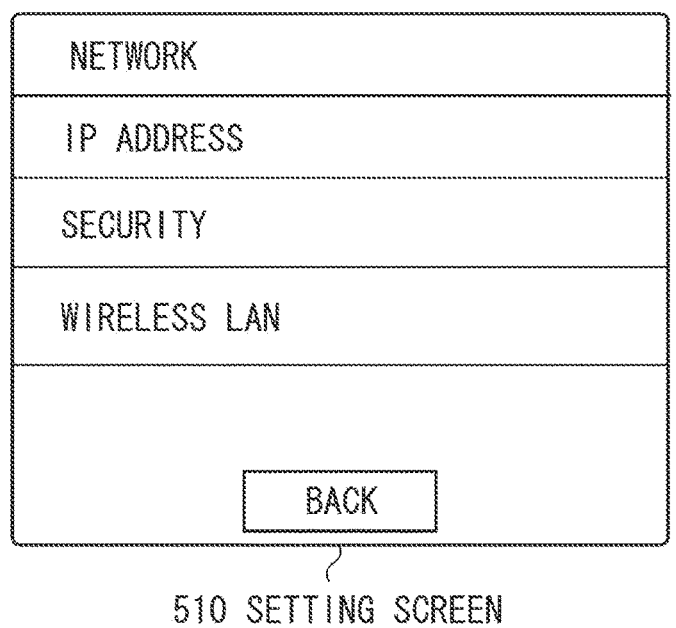

The difference between when the print application is set as the format of Bluetooth Low Energy packets to be transmitted and when the AirPrint Bluetooth Beacon is set as the format of Bluetooth Low Energy packets to be transmitted will be described in more detail. The operation unit 111 of the printing apparatus 100 displays a setting screen 500 in FIG. 5A when the print application is set as the format of Bluetooth Low Energy packets to be transmitted. The operation unit 111 of the printing apparatus 100 displays a setting screen 510 in FIG. 5B in place of the setting screen 500 in FIG. 5A when AirPrint Bluetooth Beacon is set as the format of Bluetooth Low Energy packets to be transmitted.

When the setting screens 500 and 510 are compared with each other, "device name" in a setting item 501 is the difference between the setting screens 500 and 510. While the device name set in the setting item 501 is information stored in a Bluetooth Low Energy packet in print application format, the device name is unnecessary information when the AirPrint Bluetooth Beacon format is used. Thus, when AirPrint Bluetooth Beacon is set as the format of Bluetooth Low Energy packets to be transmitted, the setting item 501 is not displayed on the setting screen 510. Alternatively, the setting item 501 can be displayed in a manner that the user cannot select the setting item 501. For example, the setting item 501 can be grayed out.

The printing apparatus 100 can perform different power-saving control processing, depending on whether the print application or AirPrint Bluetooth Beacon is set as the Bluetooth Low Energy packet format. The power-saving control processing will be described with reference to FIGS. 6A and 6B.

As illustrated in FIG. 6A, the printing apparatus 100 includes four power states. In a normal power consumption state, power is supplied to the entire printing apparatus 100. In a first power-saving state, power is not supplied to the printer 109 or the scanner 110 while power is supplied to other units of the printing apparatus 100. Since power is not supplied to the printer 109 or the scanner 110 in the first power-saving state, less power is consumed than in the normal power consumption state. In a second power-saving state, while power is supplied to the network I/F 113, power is not supplied to other units. Thus, less power is consumed in the second power-saving state than in the first power-saving state. In a third power-saving state, while power is supplied to the network I/F 113 and the Bluetooth chip 108, power is not supplied to other units. Thus, less power is consumed in the third power-saving state than in the first power-saving state. In addition, less power is consumed in the second power-saving state than in the third power-saving state.

When the Bluetooth function is used and when the print application is set as the Bluetooth Low Energy packet format, the printing apparatus 100 shifts from the normal power consumption state to the first power-saving state. This corresponds to transition 601 in FIG. 6B. The transition 601 occurs when no user operation or print processing on the printing apparatus 100 has occurred within a predetermine time, e.g., five minutes. There are cases in which, when Bluetooth Low Energy packets in print application format are transmitted, two-way Bluetooth Low Energy communication can occur between a mobile terminal that received a Bluetooth Low Energy packet and the printing apparatus 100. Since two-way Bluetooth Low Energy communication needs control processing by the CPU 101, when Bluetooth Low Energy packets in print application format are transmitted, the printing apparatus 100 does not shift to the second power-saving state or the third power-saving state. When the printing apparatus 100 receives a user operation or print data in the first power-saving state, the printing apparatus 100 shifts from the first power-saving state to the normal power consumption state. This corresponds to transition 602 in FIG. 6B.

When the Bluetooth function is used and when AirPrint Bluetooth Beacon is set as the Bluetooth Low Energy packet format, the printing apparatus 100 shifts from the normal power consumption state to the first power-saving state, and then shifts from the first power-saving state to the third power-saving state. This corresponds to the transition 601 and transition 603 in FIG. 6B. The transition 601 and the transition 603 occur when no user operation or print processing on the printing apparatus 100 has occurred within a predetermined time, e.g., five minutes. Unlike the print application format, when Bluetooth Low Energy packets in AirPrint Bluetooth Beacon format are transmitted, two-way Bluetooth Low Energy communication does not occur. Thus, the power supplied to the CPU 101 can be stopped. Thus, when Bluetooth Low Energy packets in AirPrint Bluetooth Beacon format are transmitted, the printing apparatus 100 can shift to the third power-saving state. When the printing apparatus 100 receives a user operation or print data in the third power-saving state, the printing apparatus 100 shifts from the third power-saving state to the normal power consumption state. This corresponds to transition 604 in FIG. 6B.

When the Bluetooth function is not used, the printing apparatus 100 shifts from the normal power consumption state to the first power-saving state, and then shifts from the first power-saving state to the second power-saving state. This corresponds to the transition 601 and transition 605 in FIG. 6B. The transition 601 and the transition 605 occur when no user operation or print processing on the printing apparatus 100 has occurred within a predetermined time, e.g., five minutes. When the Bluetooth function is not used, since there is no need to supply power to the Bluetooth chip 108, the printing apparatus 100 shifts to the second power-saving state. When the printing apparatus 100 receives a user operation or print data in the second power-saving state, the printing apparatus 100 shifts from the second power-saving state to the normal power consumption state. This corresponds to transition 606 in FIG. 6B.

The difference between when the print application is set as the format of Bluetooth Low Energy packets to be transmitted and when AirPrint Bluetooth Beacon is set as the format of Bluetooth Low Energy packets to be transmitted has been described with reference to FIGS. 5A, 5B, 6A and 6B.

Next, a configuration according to a second exemplary embodiment will be described. In this configuration, the format of Bluetooth Low Energy packets to be transmitted is temporarily changed in accordance with a user instruction. The hardware configuration according to the second exemplary embodiment is the same as that of the printing apparatus 100 described with reference to FIG. 1.

A printing apparatus 100 according the present exemplary embodiment transmits Bluetooth Low Energy packets in print application format described with reference to FIG. 2B. When receiving a changeover instruction from the user, the printing apparatus 100 temporarily changes the format of Bluetooth Low Energy packets to be transmitted to AirPrint Bluetooth Beacon described with reference to FIG. 2A.

Figure 7A:
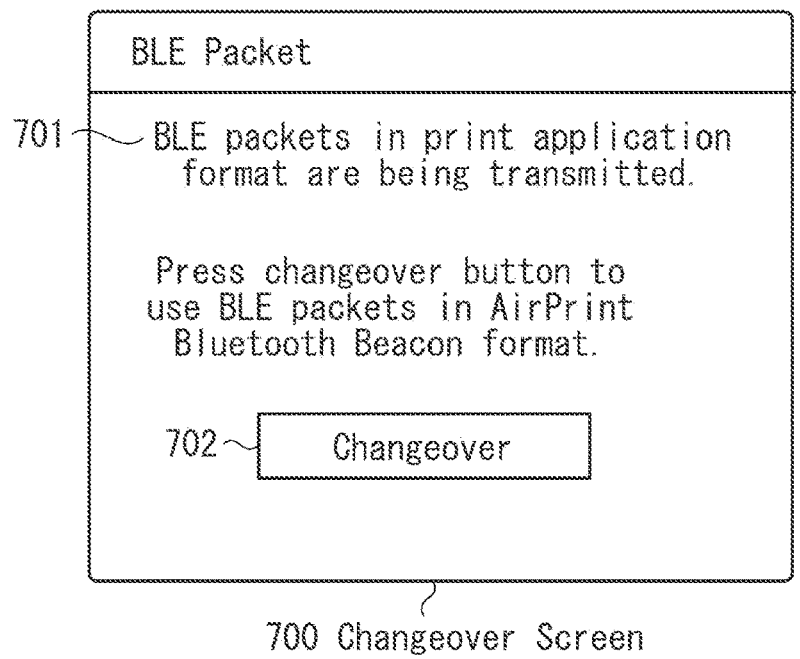
FIGS. 7A and 7B are diagrams each illustrating a change-over screen.

The operation unit 111 of the printing apparatus 100 displays a changeover screen 700 in FIG. 7A. A message 701 indicating that Bluetooth Low Energy packets in print application format are currently transmitted is displayed on the changeover screen 700. If the user wishes to use a Bluetooth Low Energy beacon in AirPrint Bluetooth Beacon format, the user presses a changeover button 702.

Figure 7B:
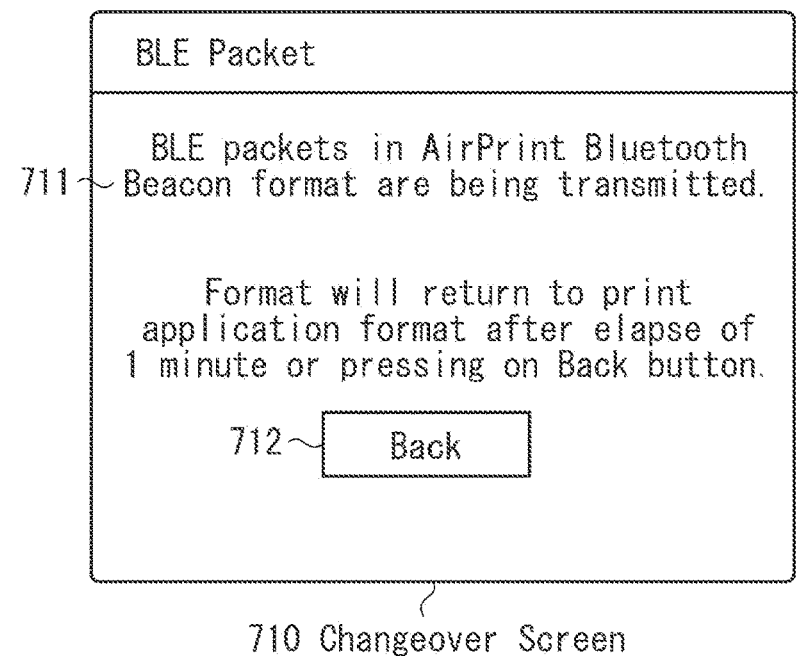

When the changeover button 702 is pressed, the printing apparatus 100 changes the format of Bluetooth Low Energy packets to be transmitted from the print application to AirPrint Bluetooth Beacon. In addition, the operation unit 111 of the printing apparatus 100 changes the screen to a changeover screen 710 in FIG. 7B. A message 711 indicating that Bluetooth Low Energy packets in AirPrint Bluetooth Beacon format are currently transmitted is displayed on the changeover screen 710. After the Bluetooth Low Energy packet format is changed to AirPrint Bluetooth Beacon, and when a predetermined condition is satisfied, the printing apparatus 100 changes the Bluetooth Low Energy packet format back to the print application format. The predetermined condition signifies the elapse of a predetermined time, e.g., one minute or pressing on a back button 712 by the user, for example. Consequently, the operation unit 111 of the printing apparatus 100 changes the screen back to the changeover screen 700 in FIG. 7A.

Figure 8:
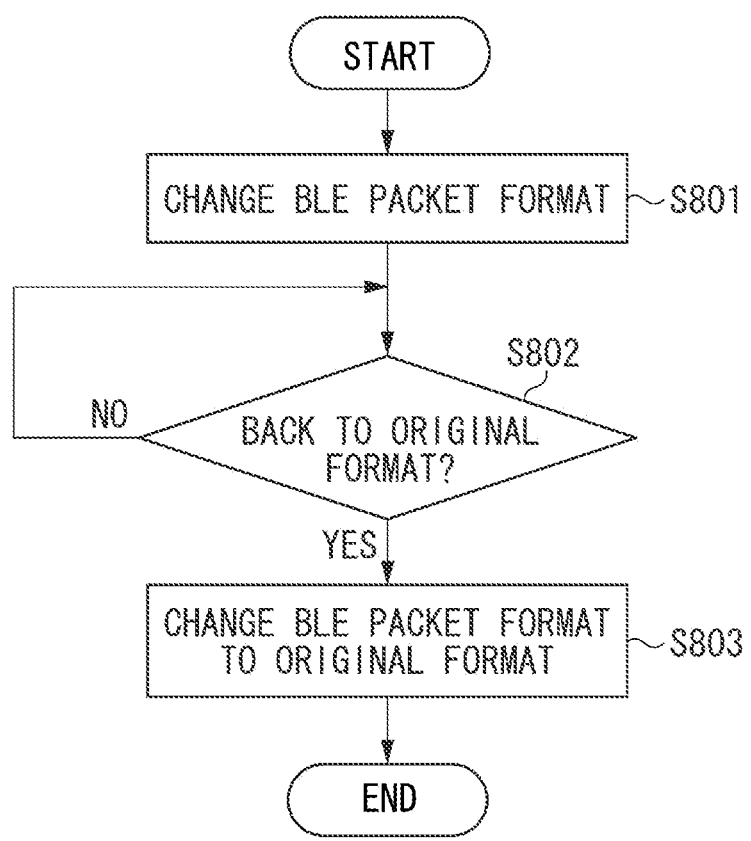
FIG. 8 is a flowchart illustrating processing for temporarily changing a format of Bluetooth Low Energy packets to be transmitted.

Next, processing of how the printing apparatus 100 changes the format of Bluetooth Low Energy packets to be transmitted will be described with reference to a flowchart in FIG. 8. Each step in the flowchart in FIG. 8 is performed by causing the CPU 101 to load a control program, which is stored in the ROM 102, in the RAM 103 and execute the control program. The processing in the flowchart in FIG. 8 is performed when the user presses the changeover button 702 on the changeover screen 700.

In step S801, the CPU 101 changes the format of Bluetooth Low Energy packets to be transmitted. In the present exemplary embodiment, the CPU 101 changes the format of Bluetooth Low Energy packets to be transmitted from the print application format to the AirPrint Bluetooth Beacon format. More specifically, the CPU 101 instructs the Bluetooth controller 107 to transmit Bluetooth Low Energy packets in AirPrint Bluetooth Beacon format. In response, the Bluetooth controller 107 controls the Bluetooth chip 108 so that Bluetooth Low Energy packets in AirPrint Bluetooth Beacon format are transmitted. The Bluetooth chip 108 stops the transmission of Bluetooth Low Energy packets in print application format and starts transmission of Bluetooth Low Energy packets in AirPrint Bluetooth Beacon format. The Bluetooth Low Energy packets in AirPrint Bluetooth Beacon format are transmitted at a predetermined cycle, e.g., at 100 msec intervals. The operation unit 111 of the printing apparatus 100 displays the changeover screen 710 in FIG. 7B.

Next, in step S802, the CPU 101 determines whether to change the format of Bluetooth Low Energy packets to be transmitted back to the original format. In a case where the user presses the back button 712 on the changeover screen 710 or in a case where a predetermined time, e.g., one minute, elapses after the execution of the processing in step S801 (YES in step S802), the CPU 101 determines to change the format of Bluetooth Low Energy packets to be transmitted back to the original format, and the processing proceeds to step S803.

Next, in step S803, the CPU 101 changes the format of Bluetooth Low Energy packets to be transmitted back to the original format. In the present exemplary embodiment, the CPU 101 changes the format from the AirPrint Bluetooth Beacon format back to the print application format. More specifically, the CPU 101 instructs the Bluetooth controller 107 to transmit Bluetooth Low Energy packets in print application format. In response, the Bluetooth controller 107 controls the Bluetooth chip 108 so that Bluetooth Low Energy packets in print application format are transmitted. The Bluetooth chip 108 stops the transmission of Bluetooth Low Energy packets in AirPrint Bluetooth Beacon format and starts transmission of Bluetooth Low Energy packets in print application format. The Bluetooth Low Energy packets in print application format are transmitted at a predetermined cycle, e.g., at 30 msec intervals. The operation unit 111 of the printing apparatus 100 displays the changeover screen 700 in FIG. 7A.

By performing the processing in the flowchart in FIG. 8, the printing apparatus 100 can change the format of Bluetooth Low Energy packets to be transmitted in accordance with a user instruction. In addition, when the condition described in step S802 is satisfied, the printing apparatus 100 can change the changed Bluetooth Low Energy packet format back to the original format.

With the above configuration, if the printing apparatus 100 receives a changeover instruction from the user while transmitting Bluetooth Low Energy packets in print application format, the printing apparatus 100 changes the format of Bluetooth Low Energy packets to be transmitted to the AirPrint Bluetooth Beacon format based on the instruction. However, the processing according to the present exemplary embodiment is also applicable to other modes. For example, if the printing apparatus 100 receives a changeover instruction from the user while transmitting Bluetooth Low Energy packets in AirPrint Bluetooth Beacon format, the printing apparatus 100 can change the format of Bluetooth Low Energy packets to be transmitted to the print application format based on the instruction.

A configuration according to a third exemplary embodiment will now be described. In this configuration, the printing apparatus 100 selects the format of Bluetooth Low Energy packets to be transmitted based on the user who has logged in the printing apparatus 100. The hardware configuration according to the third exemplary embodiment is the same as that of the printing apparatus 100 described with reference to FIG. 1.

A user management table 900 in FIG. 9 includes user information managed by the printing apparatus 100 and stored in the HDD 104. In the user management table 900, a user name, a user ID, a password, and a Bluetooth Low Energy packet format are defined per user. The Bluetooth Low Energy packet format corresponding to a user in the user management table 900 indicates the Bluetooth Low Energy packet format used by the user. For example, the user with user name "Tanaka" uses Bluetooth Low Energy packets in print application format, while the user with user name "Sato" uses Bluetooth Low Energy packets in AirPrint Bluetooth Beacon format.

Next, processing performed by the printing apparatus 100 when a user logs into the printing apparatus 100 will be described with reference to a flowchart in FIG. 10. Each step in the flowchart in FIG. 10 is performed by causing the CPU 101 to load a control program, which is stored in the ROM 102, into the RAM 103 and execute the control program. The processing in the flowchart in FIG. 10 is performed when the IC card reader 112 reads an IC card held by a user.

In step S1001, the CPU 101 determines whether the user holding an IC card can log into the printing apparatus 100 based on the user information read from the IC card. The user information read from the IC card includes a user ID and a password. The CPU 101 determines whether the user ID and the password match user information managed in the user management table 900. In step S1001, in a case where the user information read from the IC card matches user information managed in the user management table 900 (YES in step S1001), the CPU 101 determines that the user can log into the printing apparatus 100, and the processing proceeds to step S1002. If the user information does not match (NO in step S1001), the CPU 101 determines that the user cannot log into the printing apparatus 100, and the processing proceeds to END in the flowchart in FIG. 10.

In step S1002, the CPU 101 determines the Bluetooth Low Energy packet format corresponding to the logged-in user. The CPU 101 determines the Bluetooth Low Energy packet format corresponding to the logged-in user by referring to the user information read from the IC card and the user management table 900. For example, if the user name of the logged-in user is "Tanaka", the CPU 101 determines the Bluetooth Low Energy packet format corresponding to the logged-in user to be the print application. In step S1002, in a case where the CPU 101 determines that the Bluetooth Low Energy packet format corresponding to the logged-in user to be the print application (YES in step S1002), the processing proceeds to step S1003. In step S1002, in a case where the CPU 101 determines that the Bluetooth Low Energy packet format corresponding to the logged-in user to be AirPrint Bluetooth Beacon (NO in step S1002), the processing proceeds to step S1004.

In step S1003, the CPU 101 transmits Bluetooth Low Energy packets in print application format. More specifically, the CPU 101 instructs the Bluetooth controller 107 to transmit Bluetooth Low Energy packets in print application format. In response, the Bluetooth controller 107 controls the Bluetooth chip 108 so that Bluetooth Low Energy packets in print application format are transmitted. The Bluetooth chip 108 transmits Bluetooth Low Energy packets in print application format at a predetermined cycle, e.g., at 30 msec intervals.

In step S1004, the CPU 101 transmits Bluetooth Low Energy packets in AirPrint Bluetooth Beacon format. More specifically, the CPU 101 instructs the Bluetooth controller 107 to transmit Bluetooth Low Energy packets in AirPrint Bluetooth Beacon format. In response, the Bluetooth controller 107 controls the Bluetooth chip 108 so that Bluetooth Low Energy packets in AirPrint Bluetooth Beacon format are transmitted. The Bluetooth chip 108 transmits Bluetooth Low Energy packets in AirPrint Bluetooth Beacon format at a predetermined cycle, e.g., at 100 msec intervals.

In step S1005, the CPU 101 determines whether the user has logged out. In a case where the user logs out of the printing apparatus 100 or in a case where a predetermined time, e.g., 5 minutes, has elapsed without any user operation on the printing apparatus 100 (YES in step S1005), the CPU 101 determines that the user has logged out of the printing apparatus 100. In such case, the processing proceeds to step S1006.

In step S1006, the CPU 101 transmits Bluetooth Low Energy packets in a default format. In the present exemplary embodiment, the print application format or the AirPrint Bluetooth Beacon format is registered in the printing apparatus 100 as the default format. In step S1006, the CPU 101 instructs the Bluetooth controller 107 to transmit Bluetooth Low Energy packets in the default format. In response, the Bluetooth controller 107 controls the Bluetooth chip 108 so that Bluetooth Low Energy packets in the specified format are transmitted. The present exemplary embodiment assumes that the Bluetooth chip 108 had been transmitting Bluetooth Low Energy packets in default format before the user logged in the printing apparatus 100.

As described above, the printing apparatus 100 can select the format of Bluetooth Low Energy packets to be transmitted based on the user who is logged into the printing apparatus 100.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-230829, filed Nov. 29, 2016, which is hereby incorporated by reference herein in its entirety.

What is claimed is:

1. A printing apparatus that performs wireless communication based on Bluetooth Low Energy, the printing apparatus comprising:

a printer that performs print processing based on print data;
a memory device that stores a set of instructions; and
at least one processor that executes the instructions to:
receive, via an operation panel, an operation of selecting a type of Bluetooth Low Energy packets to be transmitted from a plurality of different types of Bluetooth Low Energy packets; and
transmit Bluetooth Low Energy packets in a format based on the selected type at a cycle corresponding to the selected type,
wherein the plurality of different types of Bluetooth Low Energy packets includes first type Bluetooth Low Energy packets corresponding to a print application installable in an external apparatus.

2. The printing apparatus according to claim 1, wherein the at least one processor further executes the instructions to:
set a format of a Bluetooth Low Energy packet to be transmitted based on a user instruction; and
select a format of a Bluetooth Low Energy packet to be transmitted based on a setting result.

3. The printing apparatus according to claim 2,
wherein the plurality of formats includes a first format corresponding to the print application and a second format different from the first format,
wherein, in a case where the second format is set, the printing apparatus shifts to a predetermined power-saving state, and
wherein, in a case where the first format is set, the printing apparatus does not shift to the predetermined power-saving state.

4. The printing apparatus according to claim 1,
wherein the plurality of formats includes a first format corresponding to the print application and a second format different from the first format, and
wherein, in a case where the second format is set, a predetermined setting item corresponding to the first format cannot be selected by a user.

5. The printing apparatus according to claim 4, wherein the predetermined setting item is not provided for selection in a state in which the predetermined setting item cannot be selected by the user.

6. The printing apparatus according to claim 1, wherein the at least one processor executes the instructions to select a format corresponding to a user who has logged into the printing apparatus.

7. A method for controlling a printing apparatus that performs wireless communication based on Bluetooth Low Energy, the method comprising:
selecting a format of a Bluetooth Low Energy packet to be transmitted from among a plurality of formats; and
transmitting a Bluetooth Low Energy packet in the selected format at a cycle corresponding to the selected format,
wherein the plurality of formats includes a format corresponding to a print application installed in an external apparatus.

8. A non-transitory computer-readable storage medium storing a program for causing a computer execute a method for controlling a printing apparatus that performs wireless communication based on Bluetooth Low Energy, the method comprising:
selecting a format of a Bluetooth Low Energy packet to be transmitted from among a plurality of formats; and
transmitting a Bluetooth Low Energy packet in the selected format at a cycle corresponding to the selected format,
wherein the plurality of formats includes a format corresponding to a print application installed in an external apparatus.

9. A printing apparatus that performs wireless communication based on Bluetooth Low Energy, the printing apparatus comprising:
a printer that performs print processing based on print data;
a memory device that stores a set of instructions; and
at least one processor that executes the instructions to:
receive, via an operation panel, an operation of selecting a type of Bluetooth Low Energy packets to be transmitted from a plurality of different types of Bluetooth Low Energy packets; and
transmit Bluetooth Low Energy packets in a format based on the selected type,
wherein the plurality of different types of Bluetooth Low Energy packets includes first type Bluetooth Low Energy packets corresponding to a print application installable in an external apparatus.

10. The printing apparatus according to claim 9,
wherein the plurality of formats includes two formats that include a first format corresponding to the print application and a second format different from the first format.

11. The printing apparatus according to claim 10,
wherein, in a case where the second format is set, a predetermined setting item corresponding to the first format cannot be selected by a user.

12. The printing apparatus according to claim 11, wherein the predetermined setting item is not provided for selection in a state in which the predetermined setting item cannot be selected by the user.

13. The printing apparatus according to claim 10,
wherein, in a case where the second format is set, the printing apparatus shifts to a predetermined power-saving state, and
wherein, in a case where the first format is set, the printing apparatus does not shift to the predetermined power-saving state.

14. The printing apparatus according to claim 10,
wherein the second format is AirPrint Bluetooth Beacon format.

15. The printing apparatus according to claim 9, wherein the at least one processor executes the instructions to select a format corresponding to a user who has logged into the printing apparatus.

16. The printing apparatus according to claim 9, wherein the at least one processor further executes the instructions to transmit a Bluetooth Low Energy packet in the selected format at a cycle corresponding to the selected format.

17. A method for controlling a printing apparatus that performs wireless communication based on Bluetooth Low Energy, the method comprising:
receiving, via an operation panel, an operation of selecting a type of Bluetooth Low Energy packets to be transmitted from a plurality of different types of Bluetooth Low Energy packets; and
transmitting Bluetooth Low Energy packets in a format based on the selected type,
wherein the plurality of different types of Bluetooth Low Energy packets includes first type Bluetooth Low Energy packets corresponding to a print application installable in an external apparatus.

18. A non-transitory computer-readable storage medium storing a program for causing a computer to execute a method for controlling a printing apparatus that performs wireless communication based on Bluetooth Low Energy, the method comprising:

receiving, via an operation panel, an operation of selecting a type of Bluetooth Low Energy packets to be transmitted from a plurality of different types of Bluetooth Low Energy packets; and transmitting Bluetooth Low Energy packets in a format based on the selected type, wherein the plurality of different types of Bluetooth Low Energy packets includes first type Bluetooth Low Energy packets corresponding to a print application installable in an external apparatus.

\* \* \* \* \*